United States Patent [19]

Burwell

[11] Patent Number: 5,141,260

[45] Date of Patent: Aug. 25, 1992

[54] FORCE-TRANSFERRING DOUBLE-CONTAINMENT PLASTIC PIPE ASSEMBLY

[75] Inventor: E. Dudley Burwell, Huntsville, Ala.

[73] Assignee: Fluid Controls, Inc., Huntsville, Ala.

[21] Appl. No.: 650,095

[22] Filed: Feb. 4, 1991

[51] Int. Cl.⁵ ............................................. F16L 21/00
[52] U.S. Cl. ................................ 285/133.1; 285/189; 405/52; 405/128
[58] Field of Search ................. 405/154, 52, 128, 129, 405/157; 52/19, 20; 285/236, 189, 230, 133.1, 138

[56] References Cited

U.S. PATENT DOCUMENTS

| | | | |
|---|---|---|---|
| 3,246,917 | 4/1966 | Martin | 285/133.1 X |
| 3,351,361 | 11/1967 | Martin | 285/133.1 X |
| 3,759,280 | 9/1973 | Swanson | 285/236 X |
| 3,759,285 | 9/1973 | Yoakum | 285/230 X |
| 4,103,901 | 8/1978 | Ditcher | 285/230 X |
| 4,786,088 | 11/1988 | Ziv | 285/138 |
| 4,976,457 | 12/1990 | Carter | 285/230 X |

Primary Examiner—Dennis L. Taylor
Attorney, Agent, or Firm—Phillips & Beumer

[57] ABSTRACT

A double-containment thermoplastic pipe assembly provides for transfer of differential thermal expansion forces to rigid external supports. The assembly includes a flanged restraint coupling having an inner carrier pipe portion, an outer containment pipe portion, a wall connecting the inner and outer pipe portions, and a radially extending flange around the outside of the containment pipe portion. The flange is secured to an external support such as a manhole for underground system by being cast into the wall of a cast-in-place manhole or by being engaged by rings on each side of the flange for precast manhole systems. The outer pipe terminates at the manhole wall so that the containment function within the manhole is performed by the manhole inself. For above-ground applications, the coupling is secured by engagement of the flange with a cast concrete wall or metal saddle connected to an underground footing. Both containment and carrier pipes are connected to each end of the coupling for the latter applications. Rigid spacers are placed between the two pipes along its length to provide for controlled flexing of the carrier pipe upon undergoing thermal expansion. The invention is particularly useful for polyethylene pipes and for later diameter pipes.

19 Claims, 7 Drawing Sheets

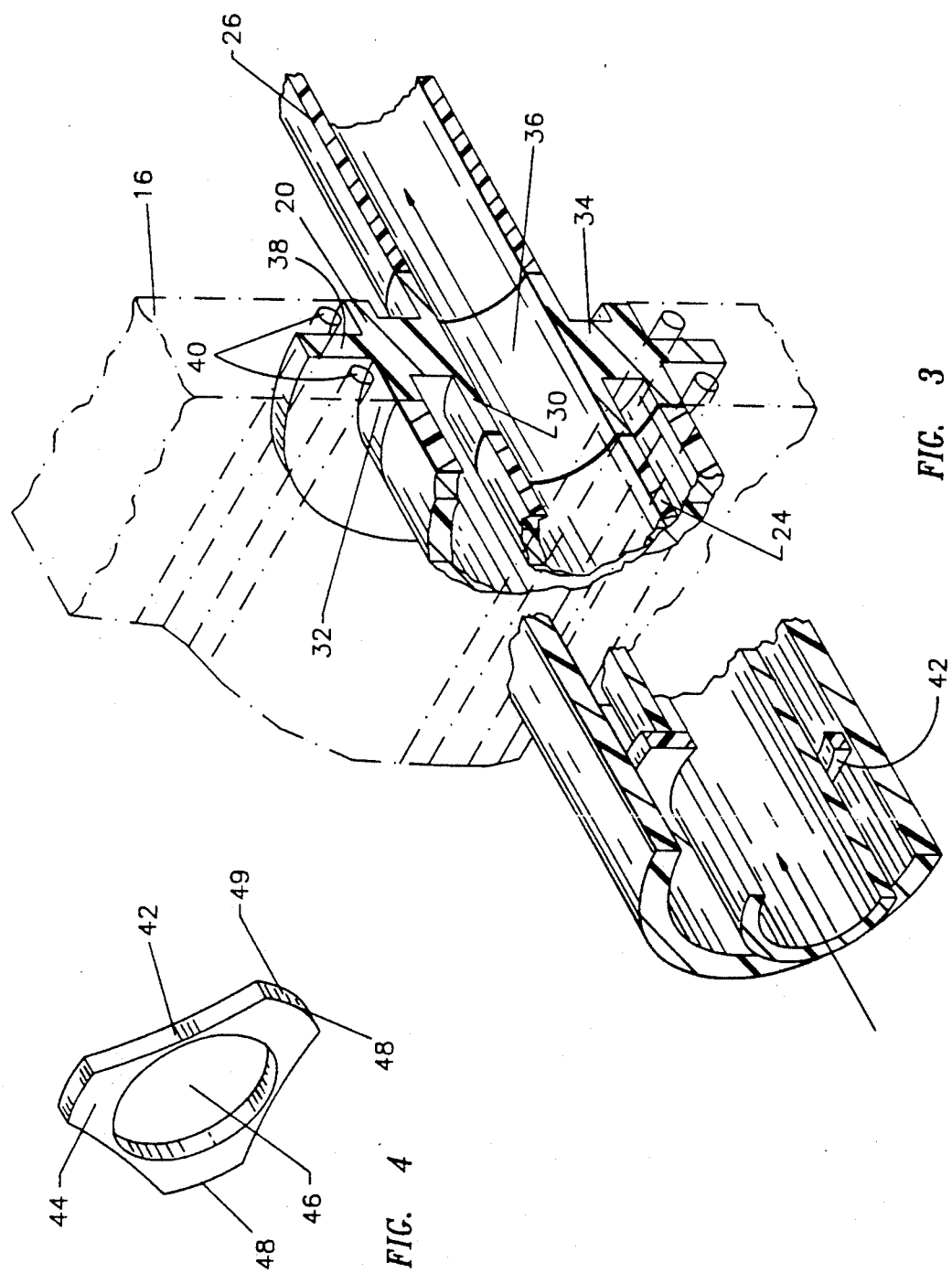

FORCE-TRANSFERRING DOUBLE-CONTAINMENT PLASTIC PIPE ASSEMBLY

FIELD OF THE INVENTION

This invention relates generally to double-containment plastic pipe systems and more particularly to measures for anchoring and compensating for differential thermal expansion in such systems.

BACKGROUND OF THE INVENTION

Double-containment piping systems utilize an inner fluid carrier pipe disposed within an outer containment pipe. For application such as conveying toxic or dangerous chemicals, double-containment systems using thermoplastic pipes and fittings provide advantages over metal systems in their ability to withstand prolonged exposure to corrosive chemicals and in their lower cost and lighter weight. The outer pipe in these double-containment systems serves to prevent leaks and spills from the inner pipe from being released to the environment; and by providing detectors in the space between pipes, leaks in the inner pipe may be detected and repaired before the chemical escapes.

One of the problems presented in the design of double-containment thermoplastic piping systems is to provide compensation for differential thermal expansion that takes place when the inner and outer pipes are exposed to widely varying temperatures. This may occur where the inner pipe is carrying a heated liquid, and the outer pipe experiences a lower temperature as by being buried underground, or where the outer pipe undergoes wide temperature variations due to changes in ambient temperature in above-ground locations. The extent of difficulty encountered in compensating for thermal expansion varies with the composition of plastic pipes, with polyethylene presenting a high degree of difficulty owing to its high coefficient of thermal expansion and its characteristics of expanding up to 10 inches per 100 feet upon its being subjected to temperature changes such as 70° F., which may be encountered in some applications. Another problem arising in underground systems feeding into a manhole is in obtaining a water-tight seal between the outer pipe and terminal connections to manholes which are normally made of concrete. Leakage has occurred at this point in prior systems owing to differences in expansion and contraction, a lack of chemical bonding between polyethylene and concrete and the smooth surface of the pipe, which does not resist movement.

Various measures for compensating for differential thermal expansion in thermoplastic double-containment piping systems are disclosed in the prior art. U.S. Pat. No. 4,786,088, issued Nov. 22, 1988, to Ziu, discloses an assembly in which restraint couplings rigidly connecting the carrier pipe and containment pipe to one another are placed in end-to-end relation with sections of the pipe. The assembly also discloses the use of a plurality of spaced-apart clips along the length of the pipe, the clips engaging the carrier pipe around a part of its circumference and having legs that engage the containment pipe. This patent is concerned with thermal expansion that occurs over long lengths of carrier pipe and with prevention of buckling of the carrier pipe against the containment pipe that would result from such expansion. Thermal expansion of the carrier pipe is said to be controlled by periodic positive connections to the containment pipe at the restraint couplings, and concentric alignment of the carrier pipe in the containment pipe is maintained by the support clips. Various other measures for controlling thermal expansion effects are disclosed, including thickening of fittings, use of expansion loops, and especially designed double-walled elbow and T-fittings. Such double-containment fittings have proven difficult and expensive to manufacture and install, particularly for larger diameter pipes. The patent also discloses that the assembly may be anchored to an external location, but no disclosure is given as to how this would be accomplished. In regard to the types of thermoplastic material employed in the assembly, the patent states that a carrier pipe and containment pipe may be formed from a polypropylene copolymer or from polyvinylidene fluoride, and no specific mention is made of polyethylene. The assembly described in this reference is not effective for polyethylene owing to its higher expansion rate and greater tendency to bend or for larger diameter pipes that present larger expansion forces. A different approach is thus required.

SUMMARY OF THE INVENTION

The present invention is directed to a double-containment plastic pipe assembly comprising a double-containment pipe having an inner carrier pipe and an outer containment pipe and necessary fittings to restrain the pipes and transfer thermal expansion forces to an external support such as a manhole wall or other rigid structure. The two pipes are secured to one another at selected locations by means of a restraint coupling having an inner carrier pipe portion connectable to the carrier pipe in end-to-end relation, an outer containment pipe portion connectable in end-to-end relation to the containment pipe, and a rigidly extending wall connecting the carrier and containment pipe portions. For most applications, the coupling includes a radially extending flange extending around the circumference of the outside of the containment pipe portion.

For underground applications, the restraint coupling may be secured to a rigid manhole wall by being cast into the wall of a cast-in-place manhole or by being secured by connection of the coupling flange to the wall of a precast concrete manhole by means of studs embedded in the wall and engaged by steel rings disposed on each side of the flange. In the case of a manhole made of plastic such as polyethylene, the coupling preferably does not include a flange, and connection of the wall may be made by welding of the outer surface of the containment portion to the manhole wall. Restraint couplings secured to manhole walls may have the containment portion of the couplings terminated at the coupling wall so that only the carrier portion extends inward through the manhole wall. Inside the manhole the carrier pipe, secured to the carrier portion of the coupling, extends to a second manhole wall location where it is connected to a second restraint coupling for exiting the manhole in the same manner as the coupling at the entry location. The pipe connecting the couplings may extend straight across the manhole or undergo a change of direction through an elbow fitting or the like. In this arrangement, with only a carrier pipe being used inside the manhole, the manhole itself serves the containment function therein. Visual observation, sensors, or other means may be used to monitor the condition of the carrier pipe within the manhole where a containment pipe is lacking.

For above-ground applications, the restraint coupling may be cast in place in a concrete wall or secured to a rigid structure such as steel saddle by means of metal rings bolted or otherwise connected to the structure. For these applications, both the containment pipe as well as the carrier pipe preferably are passed through the support structure. Thus, the restraint coupling is provided with a containment portion as well as a carrier portion on both sides.

In all embodiments, the space between carrier and containment pipes may be monitored along the length of the pipe by providing sensors responsive to the fluid being carried and any necessary wires, fiber optic cables, or electronic components between the pipes. A hole or holes extending axially through the wall of the restraint coupling may be provided to enable passage of the wire along the length of the pipe.

Rigid spacer elements may be placed at intervals along straight runs of the pipe, the spacers comprising a plate-like body having a central aperture for being slid down the carrier pipe and a plurality of legs having an outer arcuate surface for coming into contact with the inside of the containment pipe. The spacers provide for controlled flexing of the carrier pipe within the containment pipe at locations between restraint couplings, while preventing the carrier pipe from coming in contact with the containment pipe.

Pipe assemblies embodying the invention provide compensation for differential thermal expansion between carrier and containment pipes by transfer of expansion forces from the pipes to a rigid external support. This is accomplished by means of flanged restraint couplings secured to the pipes and to an external support and by use of rigid spacers between the pipes at selected intervals to enable controlled flexing of the inner pipe. Requirements for double-containment fittings for changes in direction in underground systems are avoided by connection of the coupling to manhole walls and providing only a carrier pipe within the walls so that the containment function within the manhole is carried out by the manhole itself. These measures enable the use of highly expandable polyethylene pipe for double-containment systems and provide effective compensation for thermal expansion in using larger size pipes.

It is, therefore, an object of this invention to provide a double-containment pipe assembly that enables compensation for differential thermal expansion of carrier and containment pipes.

Another object is to provide such an assembly that enables transfer of thermal expansion forces to a fixed support.

Yet another object is to provide such an assembly that avoids a need for double-walled fittings for making change of directions in underground systems.

Still another object is to provide double-containment pipe assemblies effective for compensating for differential thermal expansion of polyethylene pipe.

Other objects and advantages of the invention will be apparent from the following detailed description and the appended claims.

BRIEF DESCRIPTION OF THE DRAWINGS

FIG. 3 is an enlarged perspective view, partly broken away, showing details of the restraint coupling and pipes of FIGS. 1 and 2.

FIG. 4 is a perspective view of a spacer fitting employed in the assembly.

DESCRIPTION OF THE PREFERRED EMBODIMENT

Figure 2:
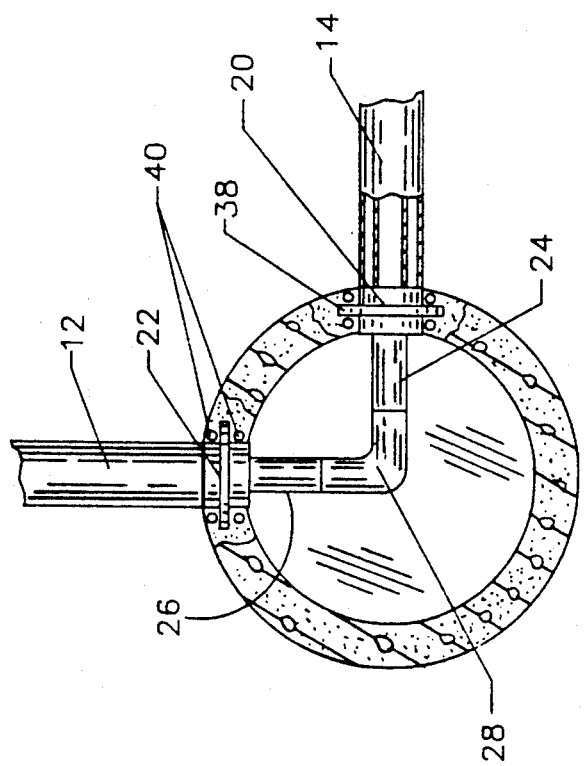
FIG. 2 is a sectional view taken along line 2—2 of FIG. 1.
Figure 1:
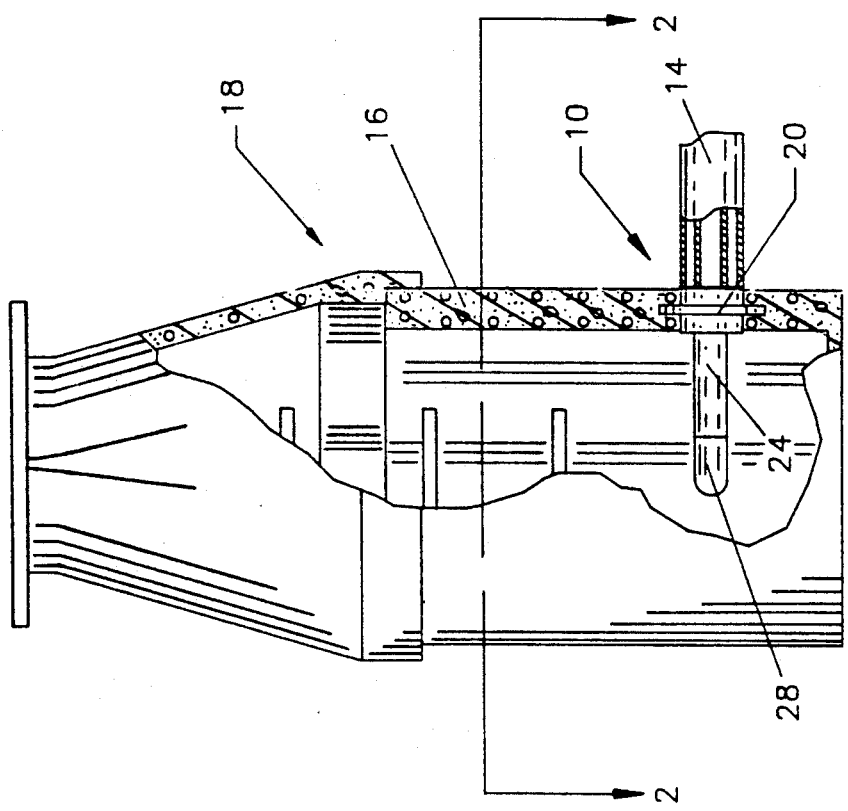
FIG. 1 is a side elevational view, partly broken away, showing a double-containment pipe assembly embodying the invention.

Referring to FIGS. 1 and 2 of the drawings, there is shown a double-containment plastic pipe assembly 10 for underground application in which double-containment pipes 12 and 14 are secured to the wall 16 of a cast-in-place concrete manhole 18 by means of flanged restraint couplings 20, 22 cast integrally with wall 16. Carrier pipe sections 24, 26 are joined to inside ends of restraint couplings 20, 22 and to elbow fitting 28, providing a 90-degree change of direction. The restraint couplings (FIG. 3) have an inner carrier pipe portion 30 and an outer containment pipe portion 32 made integral with a radially extending wall 34 having a central aperture 36 corresponding to the inner diameter of carrier pipe 24. As indicated by the arrows, fluid flow moves through the aperture and outward through coupling 20. Containment pipe portion 32 terminates at wall 34 and is not continued on the inside of the coupling so that the containment function inside the manhole is provided by the manhole itself rather than by an outer pipe at this location.

Rigid connection of the restraint coupling to wall 16 of the manhole is provided by flange 38 integral with the restraint coupling and extending radially outward around the circumference of the coupling. Reinforcing bars 40 are preferably placed in the concrete on each side of the flange to secure the coupling in place. Both ends of the carrier pipe portion 30 and the outer end of containment pipe portion 32 may be joined end to end to carrier and containment pipes by conventional butt welding. Carrier pipe portion 30 at its outer end extends outward past the outer end of containment pipe portion 32 to facilitate the butt welding process. As shown in FIGS. 3 and 4, spacers 42 are disposed between the carrier and containment pipe at locations separated longitudinally from the restraint coupling. The spacers as shown in FIG. 4 may take the form of a flat plate 44 with a central aperture 46 corresponding to the outer diameter of the carrier pipe and adapted to be slid over the carrier pipe and welded thereto. The spacers have three legs 48 terminating in arcuate ends 49, with the arcuate edges of the ends corresponding to the inner diameter of the containment pipe. Open spaces between the legs provide access for passage of wires or fiber optic cables connected to sensors along the length of the pipe for use in monitoring for leaks. In this embodiment, use of double-walled fittings for making changes of direction is avoided by employing a single walled fitting such as elbow 28 and allowing the manhole itself to perform the containment function. For this purpose, separate sensors may be disposed within the manhole, and periodic observations may be made to detect any leakage from the carrier pipe. Water leakage into the manhole around the coupling is avoided by the watertight seal obtained by the coupling being cast into the manhole wall. The rigid connection to the wall restrains the dual containment pipe from movement due to differential thermal expansion, and any such movement between rigid couplings is accommodated by allowing the carrier pipe to flex radially between spacer locations along the length of the pipe.

Figure 5:
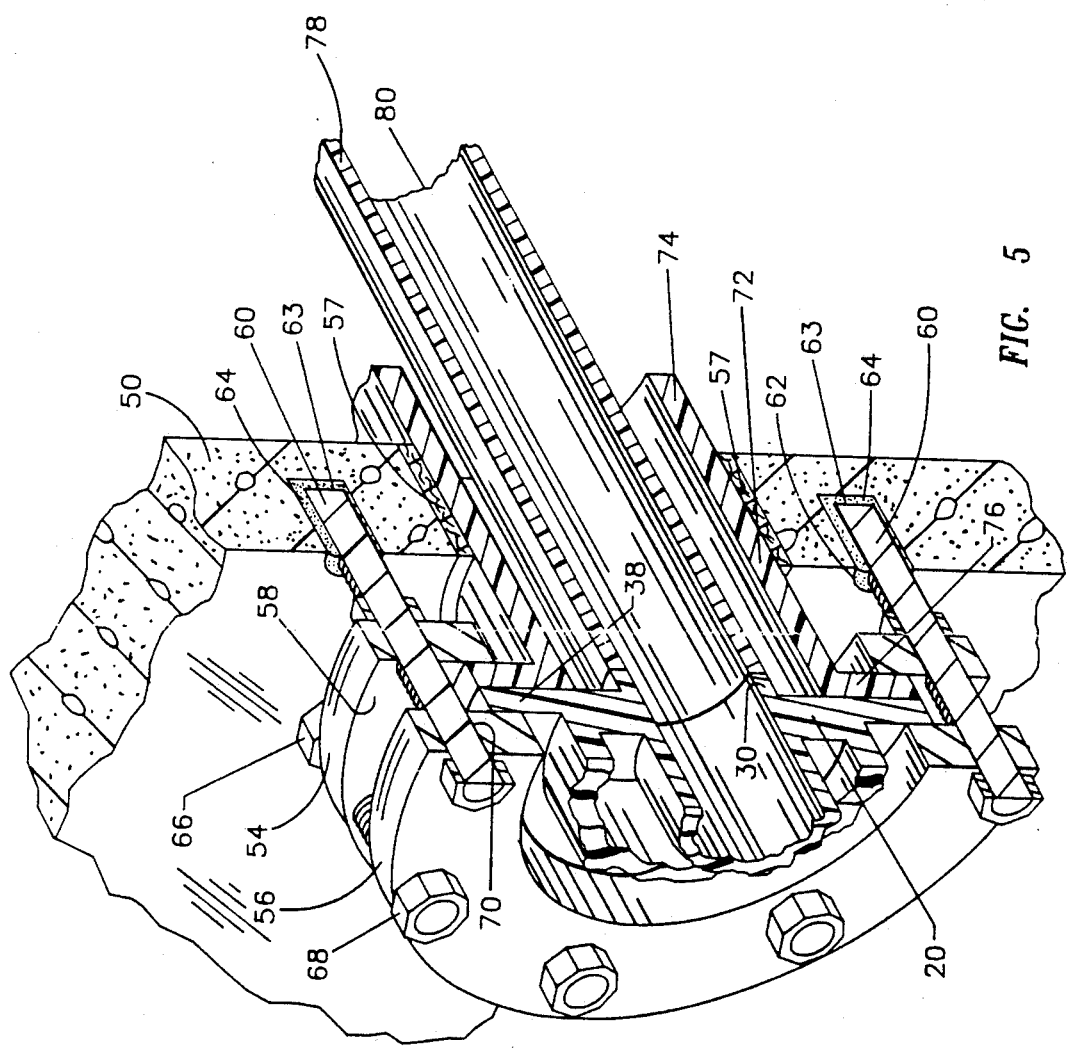
FIG. 5 is a perspective view, partly broken away, of an embodiment for a precast underground concrete manhole.

FIG. 5 shows an embodiment in which a restraint coupling 20 is secured to a wall 50 of a precast manhole. The coupling 20 is located spaced apart from the outside of the manhole and is held rigidly in place by rings 54, 56, preferably made of steel, that have flat surfaces 58 engaging the coupling flange on each side. The rings are connected to the wall by a plurality of threaded studs 60 embedded in holes 62 extending inward into the outside surface of wall 50. The holes may be obtained by drilling or by use of inserts in casting the manhole. Studs 60 may have their inner ends 63 rigidly embedded in the holes by means of epoxy resin layer 64 disposed between the walls of the holes and the stud ends. Connection to the rings is made by a pair of nuts 66, 68 tightened against the rings on the inside of ring 54 and the outside of ring 56, the studs extending axially through the rings through apertures 70.

In the embodiment shown in FIG. 5, a flanged fitting 72 comprising a length of pipe 74 which may have the same diameter as a containment pipe and a radially extending flange 76 at its outer end is disposed with flange 76 secured in place against flange 38 of a restraint coupling by rings 54 and 56. Carrier pipe segment 78 has its outer end welded to the inside of the carrier portion 30 of restraint coupling and its inner end 80 connected to a second restraint coupling (not shown) at another location in the manhole wall, passing through an elbow or other fitting if a change of direction is desired.

Figure 6:
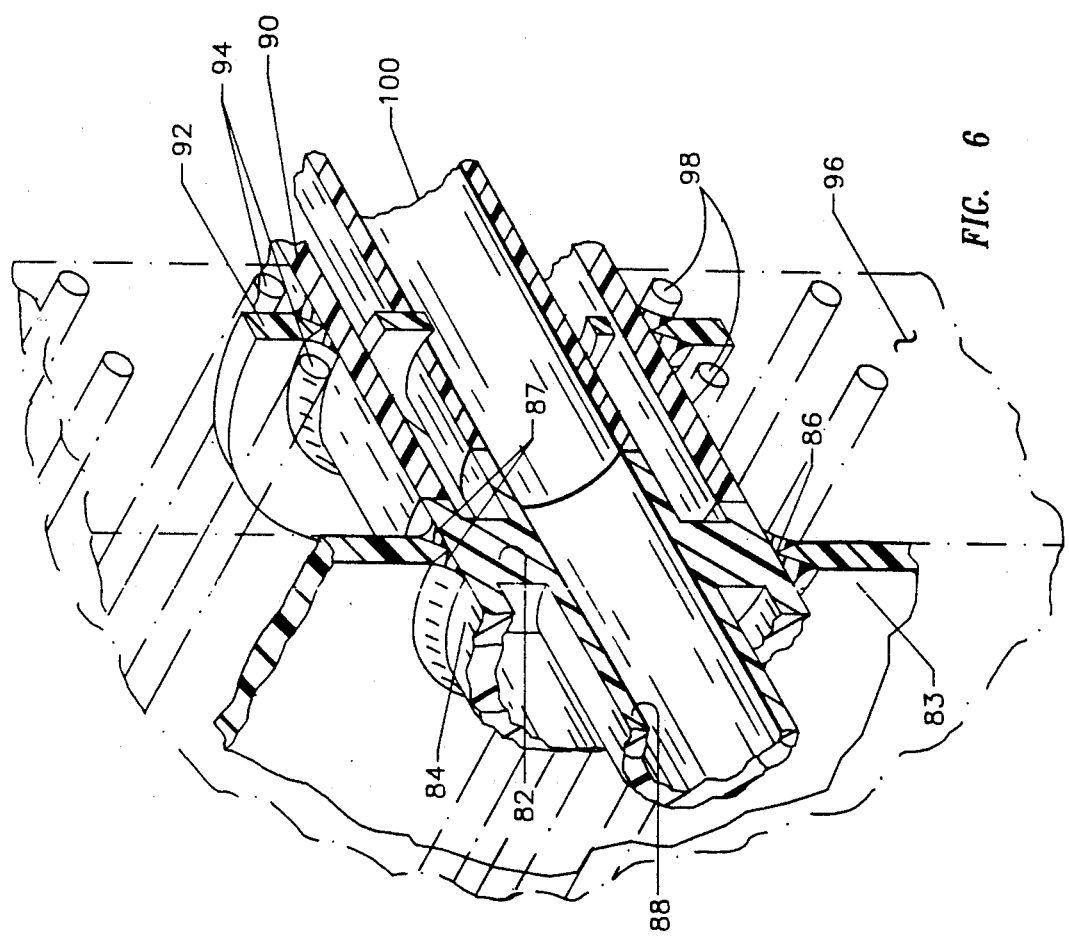
FIG. 6 is a perspective view, partly broken away, of an embodiment for connection of a polyethylene manhole.

FIG. 6 shows an embodiment wherein a restraint coupling 82 is secured to the wall 83 of a manhole made of polyethylene. The coupling 82 may have the same structure as coupling 20 of FIG. 3 except that it does not include a flange being connected directly to the manhole wall. The coupling instead has the outer surface 84 of its containment portion joined to the edge of aperture 86 extending through the manhole wall by being welded, with beads 87 on both sides of the wall being built up by the welding process to provide a strong joint. In addition to being secured to the polyethylene manhole wall, the restraint coupling is secured to a concrete ring 96 surrounding and spaced apart from the manhole, the concrete ring providing additional resistance to differential longitudinal expansion of inner pipe 88 and outer pipe 90 as well as furnishing a heavy mass to prevent the lightweight polyethylene manhole from floating up out of the ground. In this embodiment, outer pipe 90, which may be made integral with the containment portion of coupling 82 or provided as a separate segment welded thereto, has a radially disposed flange 92 extending around and welded to its outer surface with weld beads 94 providing further strength to the joint. Flange 92 is cast in place in concrete ring 96, reinforcing bars 92 being placed on each side of the flange to hold it securely in place.

Figure 7:
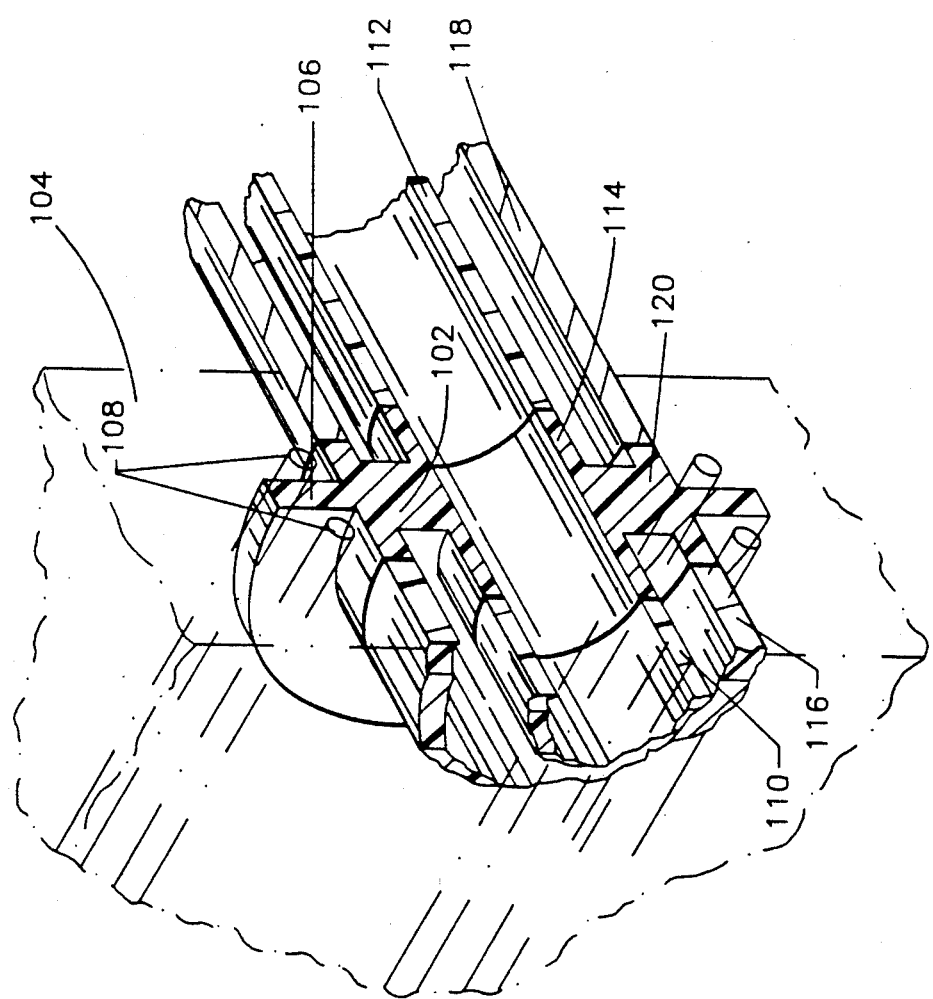
FIG. 7 is a perspective view, partly broken away, of an embodiment for above-ground use.

FIG. 7 shows an embodiment for above-ground applications wherein a restraint coupling 102 is cast in place in a concrete wall 104. Concrete is cast around the coupling with reinforcing bars 108 being placed on each side of flange 106 to provide high strength. Both ends of the coupling have a carrier pipe 110, 112 and a containment pipe 118, 120, respectively, connected to the carrier portion 114 and the containment portion 120 thereof. Unlike the embodiments for manholes, containment by the outer pipe is provided on both sides of the coupling.

Figure 9:
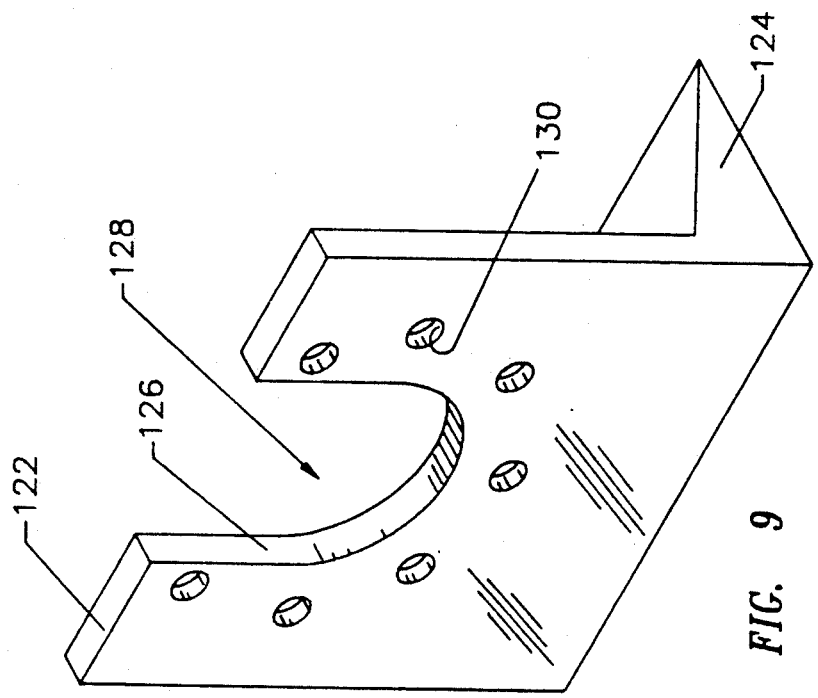
FIG. 9 is a perspective view of the metal saddle of FIG. 8.
Figure 8:
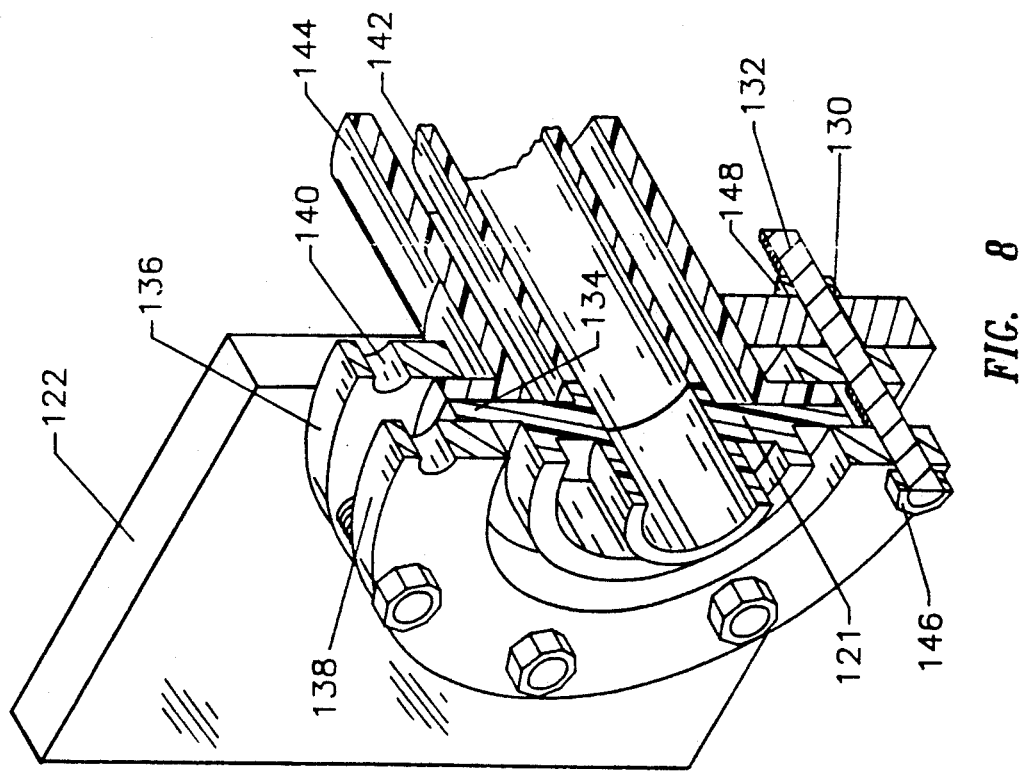
FIG. 8 is a perspective view, partly broken away, of an above-ground embodiment wherein a restraint coupling is secured to a metal saddle.

FIGS. 8 and 9 show an above-ground assembly providing for securing of a restraint coupling 121 to a metal saddle 122 that in turn is connected to a rigid footing 124. Saddle 124 may comprise a steel plate having at its upper end 128 a U-shaped portion 126 providing an opening 128 for insertion therein of a restraint coupling or pipe 144 connected thereto. The saddle has a plurality of apertures 130 extending axially therethrough around its periphery for receiving bolts 132. Flange 134 has a flat surface extending radially for being mated with radially extending flange 135 of a flanged fitting comprising flange 135 and outer pipe segment 144. Steel rings 136, 138, which have holes 130 extending axially therethrough for receiving bolts 132, are placed outside of and in contact with flanges 134, 135 assembled as shown. The bolts are located outside the circumference of the flanges which they secure. Nuts 146, 148 are screwed onto ends of the bolts so as to rigidly secure the flanges to one another and to the saddle. This embodiment provides for connection of carrier and containment pipes on both ends of the coupling so that containment by means of an outer pipe is lost on one end as is the case for underground manhole embodiments.

Figure 10:
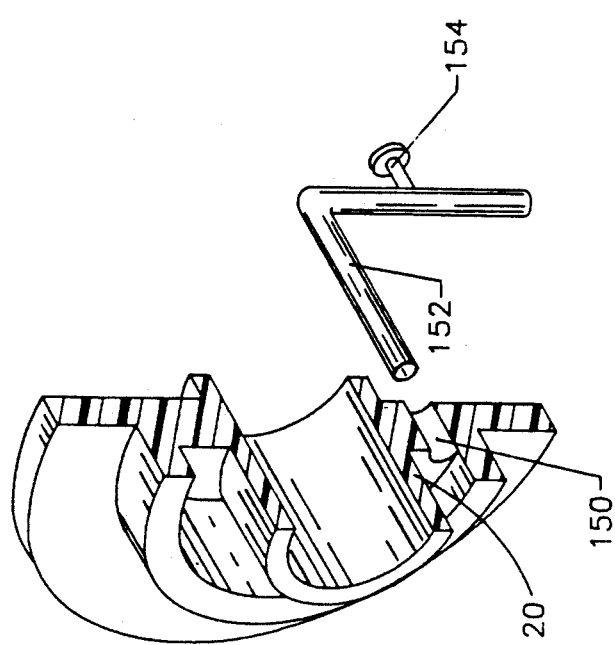
FIG. 10 is a perspective view, partly broken away and partly exploded, showing a means for providing access across a restraint coupling.

FIG. 10 shows a restraint coupling 20 having an axially extending aperture between inner and outer pipe portions. This aperture may be used for sampling across the coupling by insertion of a pipe 152 having a valve 154, which may be opened to obtain a fluid sample for analysis. An opening as shown may also be used for passage of wires, fiber optic cables, or the like extending to sensors monitoring the space between the pipes for leakage.

Figure 11:
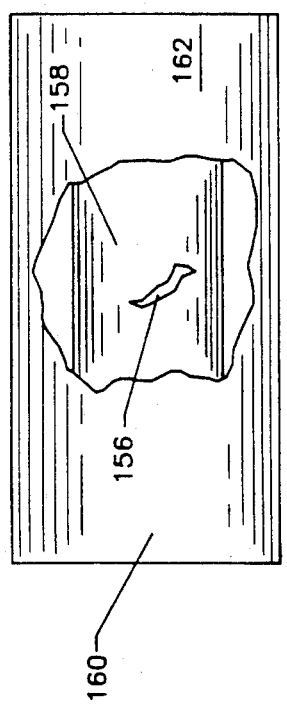
FIG. 11 is an elevational view, partly broken away, showing a double-containment pipe with a crack in its inner pipe.
Figure 12:
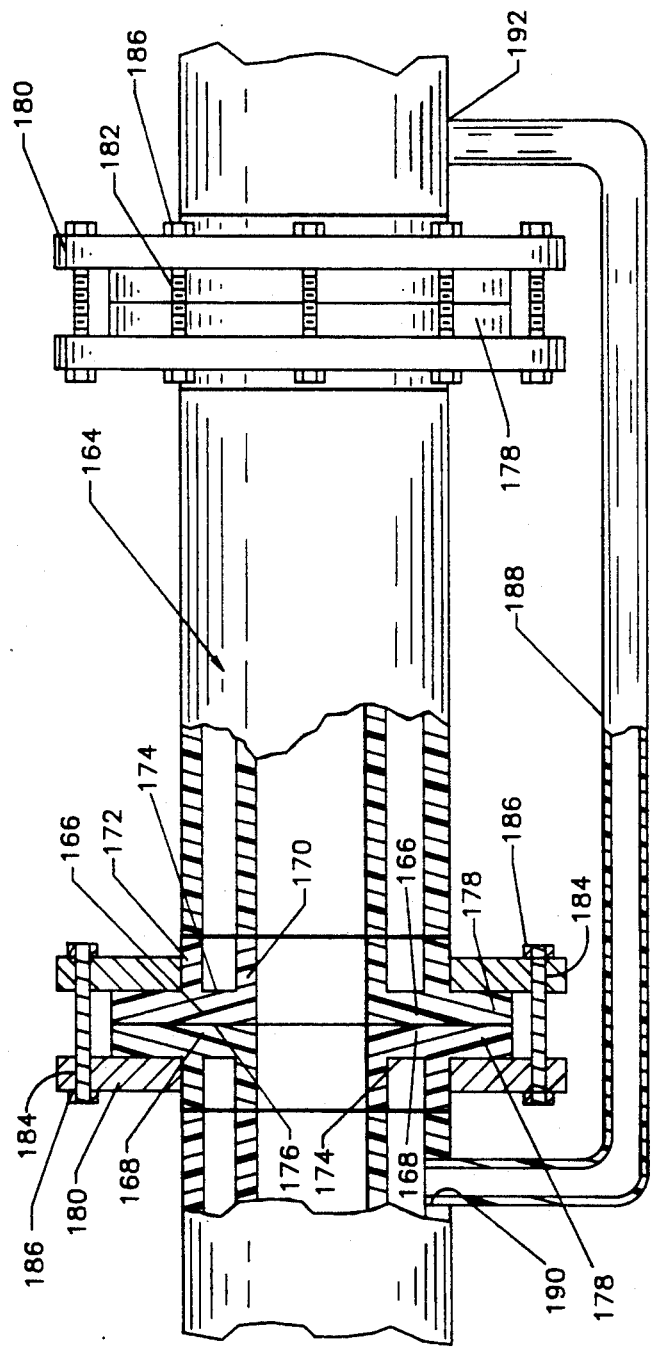
FIG. 12 is an elevational view, partly in section, showing an assembly for repairing the cracked pipe of FIG. 11.

FIGS. 11 and 12 show an embodiment wherein flanged fittings are used in repairing a leak such as might occur from a crack 156 developing in the inner pipe 158 of a double-containment pipe 160, the leak and its location having been determined by a sensor system (not shown). In repairing the leak, a section 162 of the entire pipe, spaced apart from both sides of the crack, is cut away by means such as sawing and providing a replacement section 164 to fill the gap. At the joint area at each end of the replacement section a pair of flanged couplings 166, 168 are provided, each having a carrier pipe portion 170 for connection to the carrier pipe, a containment pipe portion 172 for connection to the containment pipe, and a wall portion 174 integral with the pipe portions. The couplings have a flat surface 176 opposite to the pipe portions for being brought into mating contact and a radially extending flange 178 around their outside. The couplings may be connected to the pipe ends by welding and secured to one another by back-up rings 180 engaging the flanges and tightened together by bolts 182 extending through holes 184, the bolts being engaged by nuts 186. Owing to blockage of the space between pipes by wall portions 174, a bypass tube or pipe 188 is connected to the containment pipe at holes 190, 192 so as to communicate the spaces between pipes with one another across the coupling. For smaller diameter pipes such as ten inches or less, a bypass tube or pipe may not be necessary, and communication across the couplings may be obtained by providing slotted holes through the coupling walls, lined up to provide a continuous opening with a gasket placed around the slots to prevent leakage. A joint as shown in FIG. 12 would be provided at each end of the replacement section.

Assemblies embodying the invention are useful for double-containment pipes for which control or compensation for differential thermal expansion have proven difficult, in particular, larger pipes having diameters of 18 to 20 inches or more made of polyethylene or other highly expansible material.

Specific dual containment systems may be designed depending on the material used, pipe dimensions, and expected service temperatures for the inner and outer pipes. For example, assume an underground pipe is to be placed between two manholes 200 feet apart, the pipes made of high-density polyethylene, the outer pipe 24 inches in outside diameter, with a wall thickness of 0.738 inch; the inner pipe 18 inches in outside diameter with a wall thickness of 0.692 inch; expected ground temperature 65° F., liquid temperature 90° F.; depth of burial 8 feet. In operation, the containment pipe will remain at a near-constant temperature because of being buried underground, while the carrier pipe temperature rapidly increases to the temperature of the fluid and remains at that temperature. Under these conditions, the carrier pipe, if unrestrained, will undergo an increase in length of 7 inches, exerting a force of 5,008 pounds in the longitudinal direction. If the ends of the pipe are restrained as by being rigidly secured to a manhole wall, the force will produce lateral movement of the carrier pipe to the extent of 93 inches if no spacers or centralizers are placed between the pipes at locations between the manholes. This amount of force and resulting lateral movement would cause the carrier pipe to be pushed against the containment pipe wall and to collapse. By providing spacers every 8 feet along the length of the pipe, the lateral movement will be reduced to 3.72 inches, which movement would result in forming an S-shaped pattern once the outer pipe is reached. Lateral expansion would thus be accommodated by movement of 1.85 inches on each side of the carrier pipe. Destructive effects of carrier pipe expansion would thus be avoided.

The above example is merely illustrative and is not to be understood as limiting the scope of the invention, which is limited only as indicated by the appended claims.

I claim:

1. A double-containment thermoplastic pipe assembly comprising:

a double-containment pipe comprising an outer containment pipe and an inner carrier pipe disposed concentrically within the containment pipe;

a restraint coupling having an inner carrier pipe portion connectable end to end to an end of said inner carrier pipe, an outer containment pipe portion connectable end to end to an end of said containment pipe and defining an outer circumferential surface, a rigid, radially extending wall connecting said carrier portion and said containment portion, and a flange integral with said containment portion and extending radially outward from said surface, said flange having a rectangular cross section and a thickness greater than said pipes;

a reinforced concrete wall rigidly secured in place; and said flange being fixedly secured to said concrete wall.

2. An assembly as defined in claim 1 wherein said flange is cast in place in said reinforced concrete wall.

3. A double-containment polyethylene pipe assembly for underground use comprising:

at least one manhole;

a double-containment pipe comprising a plurality of linearly disposed sections, each section having an outer containment pipe and an inner carrier pipe, said sections being joined to one another in end-to-end relation;

a restraint coupling having an inner carrier pipe portion connectable end to end to an end of said inner carrier pipe, an outer containment pipe portion connectable end to end to an end of said containment pipe, a rigid, radially extending wall connecting said carrier portion and said containment portion, and a radially outward extending flange integral with and disposed around said containment portion; and means securing said flange to a wall of said manhole.

4. An assembly as defined in claim 3 wherein said manhole is made of concrete, and said means securing said flange comprises a portion of said wall cast in place around said flange.

5. An assembly as defined in claim 3 wherein said manhole is a precast concrete manhole, and said means securing said flange comprises a pair of rings engaging said flange at each side thereof and plurality of axially extending studs having their inner ends embedded in said wall, and means for rigidly connecting said studs to said rings at a location spaced apart outwardly from the manhole wall.

6. An assembly as defined in claim 5 wherein said double-containment pipe is connected to the outer end of said coupling, a carrier pipe is connected to its inner end, and a flanged containment pipe adapter section terminating near the manhole wall is secured to the containment pipe portion of said coupling on its inner end, and said adapter is disposed through an aperture in said wall.

7. An assembly as defined in claim 6 including a sealant disposed between said adapter and said wall around said aperture.

8. An assembly as defined in claim 7 including a pair of apertures in said wall, each having a restraint coupling and flanged adapter secured thereto, and said carrier pipe inside of said manhole being secured to the inside of each of said carrier pipe portions of said coupling.

9. An assembly as defined in claim 3 including a plurality of rigid spacers engaging the outside of the carrier pipe of said double-containment pipe and the inside of the containment pipe thereof, said spacers being disposed at predetermined locations along the length of said double-containment pipe for causing the carrier pipe to undergo controlled flexing upon expanding linearly as a result of differential thermal expansion.

10. A double-containment polyethylene pipe assembly for above-ground use comprising:
   a double containment comprising a plurality of sections, an inner carrier pipe disposed concentrically within a containment pipe;
   a restraint coupling having an inner carrier pipe portion connectable end to end to an end of said inner carrier pipe, an outer containment pipe portion connectable end to end to an end of said containment pipe, a rigid, radially extending wall connecting said carrier portion and said containment portion, and a radially outward extending flange having a rectangular cross section and integral with and disposed around said containment portion;
   a support member secured rigidly in place;
   means securing said flange to said support member; and
   said coupling having a carrier pipe section and a containment pipe section connected thereto on both ends of the coupling.

11. An assembly as defined in claim 10 wherein said support member is a concrete wall embedded in the ground, and said means securing said flange is a portion of the concrete wall cast around said flange.

12. An assembly as defined in claim 11 including a pluraltiy of rigid spacers engaging the outside of the carrier pipe of said double-containment pipe and the inside of the containment pipe thereof, said spacers being disposed at predetermined locations along the length of said double-containment pipe for causing the carrier pipe to undergo controlled flexing upon expanding linearly as a result of differential thermal expansion.

13. An assembly as defined in claim 10 wherein said support member comprises a metal saddle and means securing the saddle to an underground footing.

14. An assembly as defined in claim 13 wherein said means securing said flange in place comprises a pair of rings engaging sides of said flange, said rings being rigidly secured to one another and to said saddle.

15. A double-containment thermoplastic pipe assembly comprising:
   a double-containment thermoplastic pipe comprising an outer containment pipe and an inner carrier pipe disposed concentrically within the containment pipe;
   a restraint coupling having an inner carrier pipe portion connectable end to end to an end of said inner carrier pipe, an outer containment pipe portion connectable end to end to an end of said containment pipe, and a rigid, radially extending wall connecting said carrier portion and said containment portion;
   an underground thermoplastic manhole having at least one aperture in a wall thereof for receiving a said restraint coupling;
   said restraint coupling having its outer containment pipe portion welded to said wall of said aperture;
   said restraint coupling at both ends thereof having its carrier pipe portion and its containment pipe portion joined to corresponding pipes of said double-containment pipe;
   a radially extending flange joined to the outside of said containment pipe outside of said manhole spaced apart longitudinally from said coupling; and
   a concrete ring cast around the outside of said manhole and enclosing said flange.

16. The assembly as defined in claim 15 including a spacer disposed radially between said inner and outer pipes inside said manhole in alignment with said flange and having an inner edge defining an aperture for being slid over and joined to said inner pipe and legs adapted to contact the inside of said outer pipe.

17. The assembly as defined in claim 15 wherein said thermoplastic is polyethylene.

18. An assembly as defined in claim 1 wherein said thermoplastic is polyethylene.

19. An assembly as defined in claim 3 wherein said flange has a rectangular cross section and a thickness greater than said pipes.

* * * * *